Aug. 26, 1969  K. BEER  3,463,207
MACHINE FOR RECONDITIONING PNEUMATIC TYRES
Filed Dec. 22, 1966
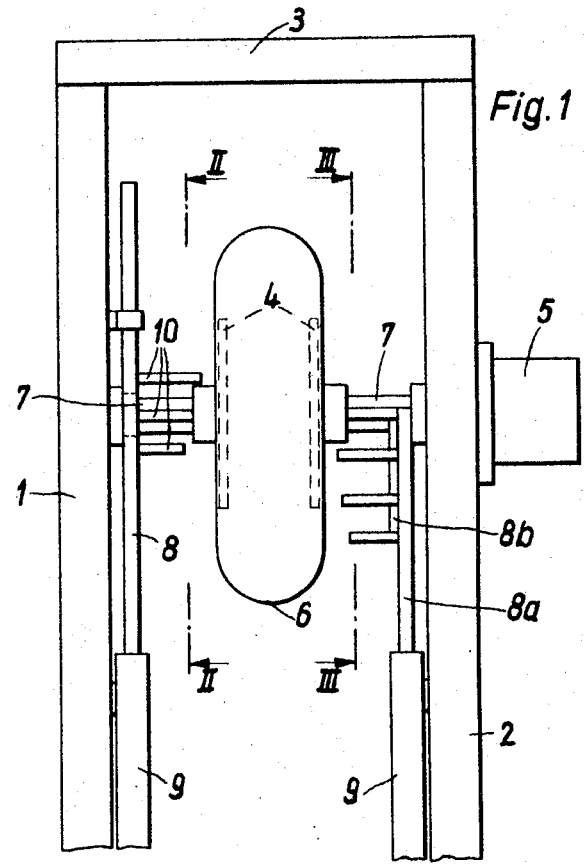
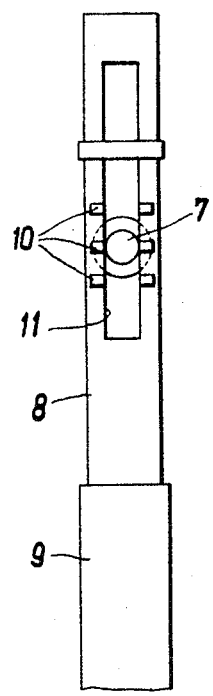
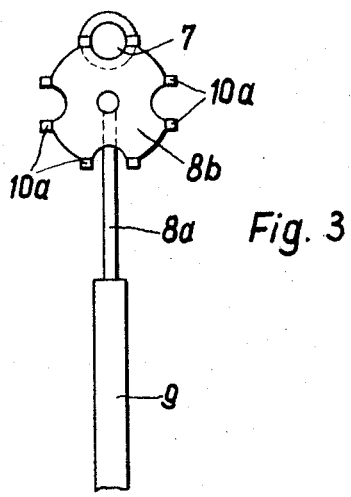
Inventor:
KARL BEER
By Barnes, Kisselle,
Raisch & Choate
ATTORNEYS

United States Patent Office 3,463,207
Patented Aug. 26, 1969

3,463,207
MACHINE FOR RECONDITIONING PNEUMATIC TYRES
Karl Beer, 46 Nabestrasse, Fischbach-Weierbach (Nahe), Germany
Filed Dec. 22, 1966, Ser. No. 603,828
Claims priority, application Germany, Dec. 24, 1965, V 30,027
Int. Cl. B29h *21/00, 21/08*
U.S. Cl. 144—288                               5 Claims

ABSTRACT OF THE DISCLOSURE

A machine for reconditioning pneumatic tyres comprising a pair of felly plates, means for inflating a tyre to be reconditioned, and one or more distance pieces mounted on a displaceable holder, said holder being movable so that the distance between the felly plates can be set by engagement of a distance piece with a felly plate.

---

This invention relates to a machine for reconditioning pneumatic tyres.

In proposed apparatus a felly plate is generally fixedly mounted on an axle, and a second felly plate is adjustably positioned on said axle. The adjusting mechanism is often provided with an indicator scale to facilitate the precise setting of the felly plates for a required tyre width.

In devices provided with an adjusting mechanism for the movable felly plate, a serious disadvantage arises with regard to the manipulation of the tyre, owing to the fact that the finished tyre cannot be removed from the apparatus until the movable felly plate has been axially displaced. Displacement of the movable felly plate can be effected only after the compressed air has been let out of the tyre, which leads to a certain enforced operational sequence of the apparatus, causing a reduction of the output rate, which may be very considerable in the case where the axial movement of the displaceable felly plate is effected mechanically.

According to the invention there is provided a machine for reconditioning pneumatic tyres comprising a pair of felly plates, means for inflating a tyre to be reconditioned, and one or more distance pieces mounted on a displaceable holder, said holder being movable so that the distance between the felly plates can be set by engagement of a distance piece with a felly plate.

By this arrangement, the tyre to be treated can be placed between the two felly plates, without having to displace axially the movable felly plate prior to or during inflation of the tyre with compressed air in order to precisely adjust the tyre width. The engagement of a distance piece corresponding to the requisite tyre width with the felly plate suffices to establish the correct distance between the felly plates. The engaged distance piece also serves as a counter-bearing for the movable felly plate. Change-over from one tyre width to another can be effected simply by bringing the distance piece corresponding to the new tyre width into engagement with a felly plate. Since all the distance pieces are mounted on a common holder, the removal of the one and the insertion of the other can be carried out in a single operation.

Generally only a small number of the distance pieces of different length are required, since usually only a few different tyre widths have to be considered.

The distance pieces are preferably mounted colinearly on the holder, the holder being displaceable in a plane parallel to the plane of the felly plate, in a direction colinear with said distance pieces. In another embodiment a plurality of distance pieces are mounted on a rotatable annular member. The annular member is mounted on a holder which is displaceable in a plane parallel to the plane of the felly plate.

The holder may be comprised in a pneumatic lifting system, which is connected to the means for inflating a tyre to be reconditioned, so that when compressed air is let out of the tyre the distance pieces are moved out of engagement with the felly plate and so that when compressed air is admitted to the tyre the distance pieces are brought into engagement with the felly plate.

A specific embodiment of the invention will now be described by way of example with reference to the accompanying drawing, in which:

FIG. 1 shows the front view of a machine for grinding or lining vehicle tyres, including means for adjusting the distance between felly plates, on both sides of a tyre to be treated;

FIG. 2 is a view taken along the line II—II of FIGURE 1, and

FIG. 3 is a view taken along the line III—III of FIGURE 1.

Referring to the drawing, the frame of the grinding or lining machine consists of two columns 1 and 2 and a crossbeam 3. Between the two columns 1, 2 a rotatably mounted clamping felly with two felly plates 4 is arranged, which is drivable by a motor 5 and is adapted for clamping a tyre 6 to be treated in the required position. (The tools and devices for treating the tyre are not illustrated, nor are the compressed-air connections therefor shown; it is to be noted, however, that the main connection for the compressed air leads into the tyre 6 through one of the felly-plate axles 7. From this main conduit secondary conduits can be derived, leading to the pneumatically actuated devices of the machine.)

The left-hand column 1 of FIG. 1 carries a holder 8, (also shown in FIG. 2). The holder 8 forms part of a pneumatic lifting system 9, which is connected to the compressed-air source of the apparatus so that when the compressed air is let out of tyre 6 a set of distance pieces 10 mounted on the holder is moved out of engagement with the associated felly plate 4, and so that when compressed air is admitted to the tyre 6, the distance pieces 10 are moved into engagement with the felly plate 4. When the compressed air is let out of tyre 6, the air also escapes from the lifting unit 9, so that the holder 8 moves downwards under its own weight. The distance pieces 10 are of different lengths, so that with their aid the distance between the two felly plates can be set. As shown in FIG. 2, the distance pieces 10 are provided in pairs, so that the associated felly plate can be symmetrically supported on both sides of axle 7. The holder 8 has an elongated aperture 11 formed therein, whereby different pairs of distance pieces may be brought into engagement with the associated felly plate.

The right-hand column 2 (as viewed in FIG. 1) carries a holder 8a, which forms part of a lifting unit 9a. A rotatable disc 8b is mounted at the upper end of holder 8a and distance pieces 10a are fastened on the circumference of the rotatable disc. The distance pieces are provided in pairs, so that the associated felly plate 4 is supported on both sides of the axle 7. The rotary disc 8b has annular recesses formed on its periphery between each pair of distance pieces, so as to enable the distance pieces to be moved into a symmetrical position in relation to axle 7.

What I claim is:

1. A machine for reconditioning pneumatic tyres comprising a pair of felly plates, means for inflating a tyre to be reconditioned, a pair of spaced holders between which said felly plates are mounted, at least one of said holders having a plurality of distance pieces of varying lengths, said one holder being transversely displaceable to bring each of said plurality of distance pieces into position for engagement with a corresponding felly plate so that the distance between the felly plates can be adjusted to accommodate tyres of different sizes.

2. A machine as claimed in claim 1 wherein said distance pieces are mounted colinearly on the holder and said holder is displaceable in a plane parallel to the plane of its respective felly plate in a direction colinear with said distance pieces.

3. A machine as claimed in claim 1 wherein the distance pieces are mounted on a rotatble annular member, said annular member being mounted on a holder and said holder being displaceable in a plane parallel to the plane of its respective felly plate.

4. A machine as claimed in claim 1 wherein each holder comprises a pneumatically operable lifting unit, said unit being coupled to the means for inflating a tyre to be reconditioned, such that when the compressed air is released from the tyre the distance pieces are moved out of engagement with the felly plate and when compressed air is admitted to the tyre, the distance pieces are moved into engagement with the felly plate.

5. A machine as claimed in claim 1 including a plurality of distance pieces mounted on the other said holder, said other holder being transversely movable to bring said second-mentioned distance pieces selectively into position for engagement with the respective felly plate.

References Cited

UNITED STATES PATENTS

| | | |
|---|---|---|
| 2,390,008 | 11/1945 | Sherwood et al. |
| 2,540,370 | 2/1951 | Jackson. |
| 2,816,606 | 12/1957 | De Hart et al. _____ 157—13 |
| 3,080,899 | 3/1963 | Robertson. |

DONALD R. SCHRAN, Primary Examiner

U.S. Cl. X.R.

157—13